United States Patent [19]

Makino et al.

[11] Patent Number: 5,408,530
[45] Date of Patent: * Apr. 18, 1995

[54] ECHO CANCELLING METHOD AND ECHO CANCELLER USING THE SAME

[75] Inventors: Shoji Makino, Machida; Yutaka Kaneda, Tokorozawa, both of Japan

[73] Assignee: Nippon Telegraph and Telephone Corporation, Tokyo, Japan

[ * ] Notice: The portion of the term of this patent subsequent to Dec. 21, 2010 has been disclaimed.

[21] Appl. No.: 127,375

[22] Filed: Sep. 28, 1993

[30] Foreign Application Priority Data

Sep. 30, 1992 [JP] Japan .................................. 4-261826

[51] Int. Cl.$^6$ ............................................. H04M 9/08
[52] U.S. Cl. ..................................... 379/392; 379/410; 379/406; 379/407; 379/402; 379/391; 379/390
[58] Field of Search ................. 379/410, 406, 407, 411, 379/402; 370/32.1

[56] References Cited

U.S. PATENT DOCUMENTS 5,001,701  3/1991  Gay ..................................... 379/406
5,272,695 12/1993  Makino et al. ...................... 379/410

OTHER PUBLICATIONS

Acoustic Echo Canceller Algorithm Based on the Variation Characteristics of a Room Impulse Response (Shoji Makino, Yutaka Kaneda) IEEE, 1990.

Primary Examiner—James L. Dwyer
Assistant Examiner—Jacques M. Saint-Surin
Attorney, Agent, or Firm—Pollock, VandeSande and Priddy

[57] ABSTRACT

A received signal vector x(n), a coefficient error covariance matrix P(n) from a memory part 12 and a forgetting factor $v$ from a memory part 13 are provided to a gain calculating part 14 to obtain a gain vector k(n). The thus obtained gain vector k(n) and an error e(n) between an echo and an echo replica are multiplied in a multiplying part 16. The multiplied output and a filter coefficient h(n) from a memory part 18 are added together to update the latter. The thus updated filter coefficient is used as the filter coefficient of an estimated echo path (an FIR filter, for example). The coefficient error covariance matrix P(n), the gain vector k(n), the received signal vector x(n) and the forgetting factor $v$ are provided to an updating part 19 to update the coefficient error covariance matrix P(n), and an adjustment matrix A representing an expectation of an impulse response variation of an echo path is added to the updated coefficient error covariance matrix P(n) and the added value is used as a new coefficient error covariance matrix P(n).

8 Claims, 6 Drawing Sheets

ECHO CANCELLING METHOD AND ECHO CANCELLER USING THE SAME

BACKGROUND OF THE INVENTION

The present invention relates to an echo cancelling method and an echo canceller for cancelling echoes that cause howling and interfere with conversation in a teleconferencing system, a hands-free audio terminal and other similar hands-free telecommunication systems.

Figure 1:
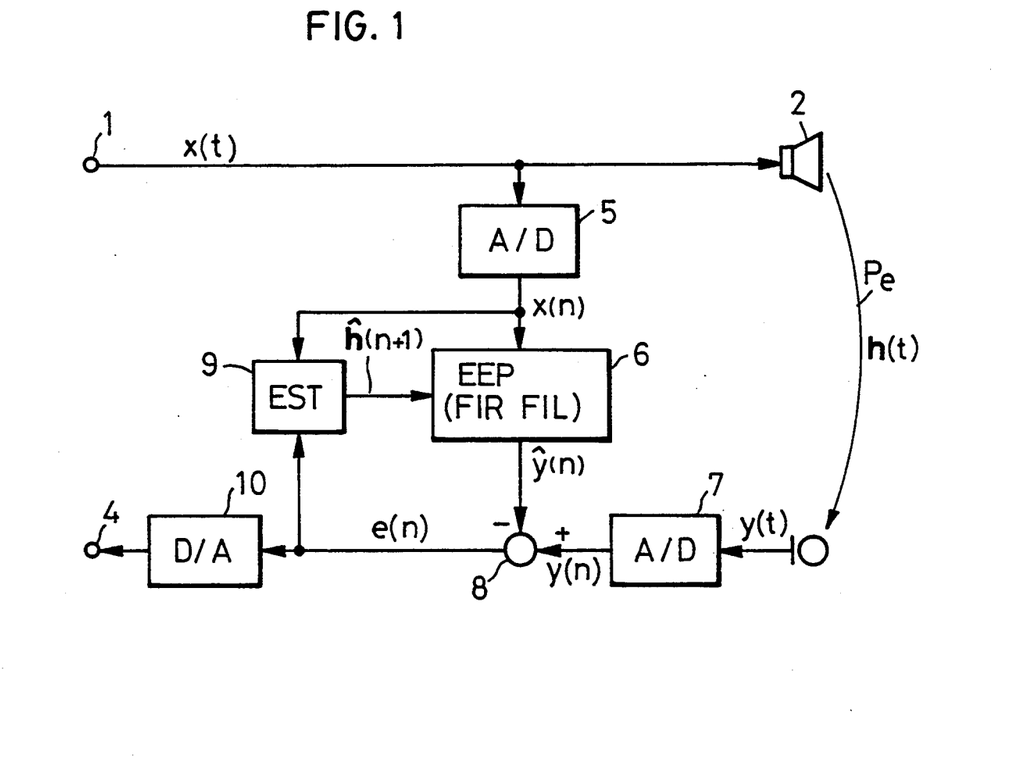
FIG. 1 is a block diagram showing a conventional echo canceller.

As satellite communication and audio teleconferencing have now come into wide use, there is a strong demand for the implementation of a telecommunication system which gives excellent simultaneous conversation performance and efficiently suppresses acoustic feedback. To meet this requirement, there have been proposed echo cancellers. In FIG. 1 there is shown, as being applied to hands-free telecommunication, a conventional echo canceller disclosed in Japanese Patent Application Laid-Open No. 220530/89. In a telecommunication system composed of a receiving system from a receive input terminal 1 for a received signal x(t) to a loudspeaker 2 and a sending system from a microphone 3 to a send out terminal 4, the received signal x(t) is sampled by an analog-to-digital (A/D) converting part 5, and the thus sampled received signal x(n) is provided onto an estimated echo path 6, from which an echo replica $\hat{y}(n)$ is output. On the other hand, an echo y(t) input into the microphone 3 is sampled by an A/D converting part 7 and the thus sampled echo y(n) is provided to a subtracting part 8, wherein the above-mentioned echo replica $\hat{y}(n)$ is subtracted from the sampled echo y(n), thereby cancelling the echo y(n) which would otherwise be fed to the send out terminal 4.

The estimated echo path 6 needs to follow up temporal variations of the echo path Pe from the loudspeaker 2 to the microphone 3. The estimated echo path 6 is formed by a digital finite impulse response (FIR) filter, for example, and the filter coefficient is iteratively adjusted by an estimating part 9 using a least-mean-squares (LMS) algorithm, a normalized LMS (NLMS) algorithm, an ES algorithm, or a recursive least-squares (RLS) algorithm so that an error, $e(n) = y(n) - \hat{y}(n)$, which is the output from the subtracting part 8, may approach zero. With such adjustment of the estimated echo path 6, optimum echo cancellation takes place at all times. The echo-cancelled send out signal from the microphone 3 is converted by a digital-to-analog (D/A) converting part 10 into analog form, thereafter being fed to the send out terminal 4.

Next, a description will be given of conventional filter coefficient adjustment schemes. Gradient type adaptive algorithms, such as the LMS algorithm and the NLMS algorithm, are expressed, in general, as follows:

$$\hat{h}(n+1) = \hat{h}(n) + \alpha[-\Delta(n)] \tag{1}$$

where
$\hat{h}(n) = (\hat{h}_1(n), \hat{h}_2(n), \ldots, \hat{h}_L(n))^T$: estimated echo path (FIR filter) coefficient, $\Delta(n)$: (mean) squared error gradient vector,
$\alpha$: step size (scalar quantity),
L: number of taps,
T: vector transpose,
n: discrete time.

In the LMS algorithm the gradient vector of the mean squared error is expressed by $$\Delta(n) = -e(n).x(n),$$

and in the NLMS algorithm it is expressed by $$\Delta(n) = \frac{-e(n) \cdot x(n)}{x(n)^T \cdot x(n)}$$

where
e(n): error $(= y(n) - \hat{y}(n))$,
$\hat{y}(n) = \hat{h}(n)^T . x(n)$,
$x(n) = (x(n), x(n-1), \ldots, x(n-L+1))^T$: received signal vector.

The ES algorithm is one in which the step size $\alpha$, conventionally given as a scalar quantity in Eq. (1), is extended to a diagonal matrix referred to as a step size matrix A. The ES algorithm is expressed by the following equation:

$$\hat{h}(n+1) = \hat{h}(n) + A[-\Delta(n)] \tag{2}$$

where $$A = \begin{bmatrix} \alpha_1 & & & 0 \\ & \alpha_2 & & \\ & & \ddots & \\ 0 & & & \alpha_L \end{bmatrix} : \text{step size matrix,}$$

Figure 2:
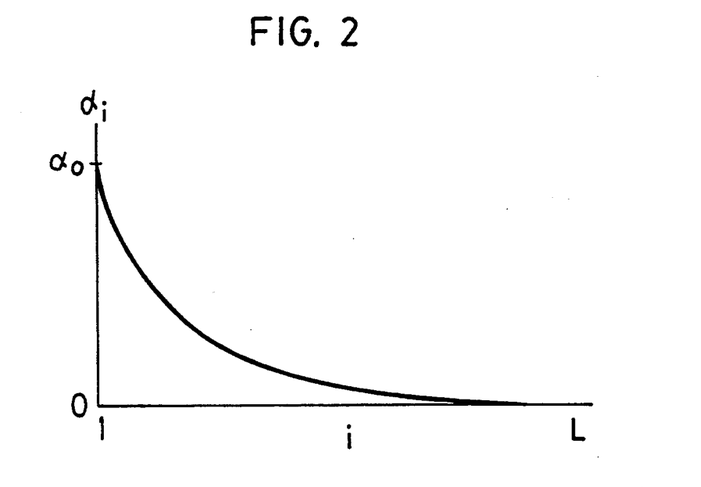
FIG. 2 is a graph showing a diagonal component $a_i$ of the adjustment matrix A.

$\alpha_i = \alpha_0 \gamma^{i-1} (i = 1, 2, \ldots, L)$, $\gamma$: exponential attenuation ratio of an impulse response variation of the acoustic echo path $(0 < \gamma < 1)$.

Where the estimated echo path 6 is formed by a digital FIR filter, its filter coefficient $\hat{h}(n)$ is a directly simulated version of a room impulse response h(n). Hence, the magnitude of adjustment of the filter coefficient that is needed for each variation of the echo path is the same as the room impulse response variation. The step size matrix A, which represents the quantity of adjustment in the filter coefficient adjustment operation, is weighted by a temporal variation characteristic of the impulse response. In general, the variation in the room impulse response is expressed as an exponential function using the attenuation ratio $\gamma$. The diagonal component $\alpha_i$ (i = 1, 2, ..., L) of the step size matrix A attenuates exponentially from $\alpha_0$ and gradually approaches 0 as i increases, with the same slope or gradient as that of the exponential attenuation characteristic of the impulse response, as shown in FIG. 2.

The step size matrix A that represents the attenuation of the room impulse response is disclosed in, for example, U.S. patent application Ser. No. 07/756,622, now Makino et al U.S. Pat. No. 5,272,695, by the inventors of this application. This algorithm is based on an acoustic finding that when the impulse response is varied by movement of a man or object, the variation (the difference in the impulse response) attenuates exponentially at the same attenuation ratio as that of the impulse response. By adjusting coefficients in an early stage of the impulse response of great variation with large steps and coefficients in a late stage of the impulse response of little variation with small steps, it is possible to obtain an echo canceller of high convergence speed.

By applying the ES algorithm to the NLMS algorithm, the estimated echo path 6 is iteratively adjusted following Eq. (3) given below, with the result that the impulse response ĥ(n) of the estimated echo path 6 approaches the impulse response h(n) of the true echo path Pe.

$$\hat{h}(n + 1) = \hat{h}(n) + \frac{A \cdot e(n) \cdot x(n)}{x(n)^T \cdot x(n)} \quad (3)$$

On the other hand, the RLS algorithm is well-known as an adaptive algorithm of fast convergence. The RLS algorithm is introduced in detail in a chapter entitled "Standard Recursive Least-Squares Estimation" in a textbook "ADAPTIVE FILTER THEORY" by SIMON HAYKIN (Prentice-Hall), for instance, and it is a significant feature of this algorithm that about the same convergence speed as that for a white noise is provided for a colored signal as well. The iterative adjustment equation of the impulse response ĥ(n) by the RLS algorithm is expressed as follows:

$$\hat{h}(n + 1) = \hat{h}(n) + e(n) \cdot k(n) \quad (4)$$

$$k(n) = \frac{v^{-1} \cdot P(n) \cdot x(n)}{1 + v^{-1} \cdot x(n)^T \cdot P(n) \cdot x(n)} \quad (5)$$

$$P(n + 1) = v^{-1}[P(n) - k(n) \cdot x(n)^T \cdot P(n)] \quad (6)$$

where
k(n): L-th order gain vector,
P(n): L×L coefficient error covariance matrix,
$v$: forgetting factor ($0 < v \leq 1$).

The matrix P(n) is defined as an inverse matrix of the covariance matrix of the input signal and when the impulse response is time-invariant and expressed as $h_0$, it can be regarded as a covariance matrix of coefficient errors as given below.

$$P(n) = E[\{h_0 - \hat{h}(n)\}\{h_0 - \hat{h}(n)\}^T] \quad (7)$$

where E[.] is statistical expectation. These equations (4) through (7) use different symbols but are essentially the same as those given in the aforementioned Simon Haykin's textbook.

Figure 3:
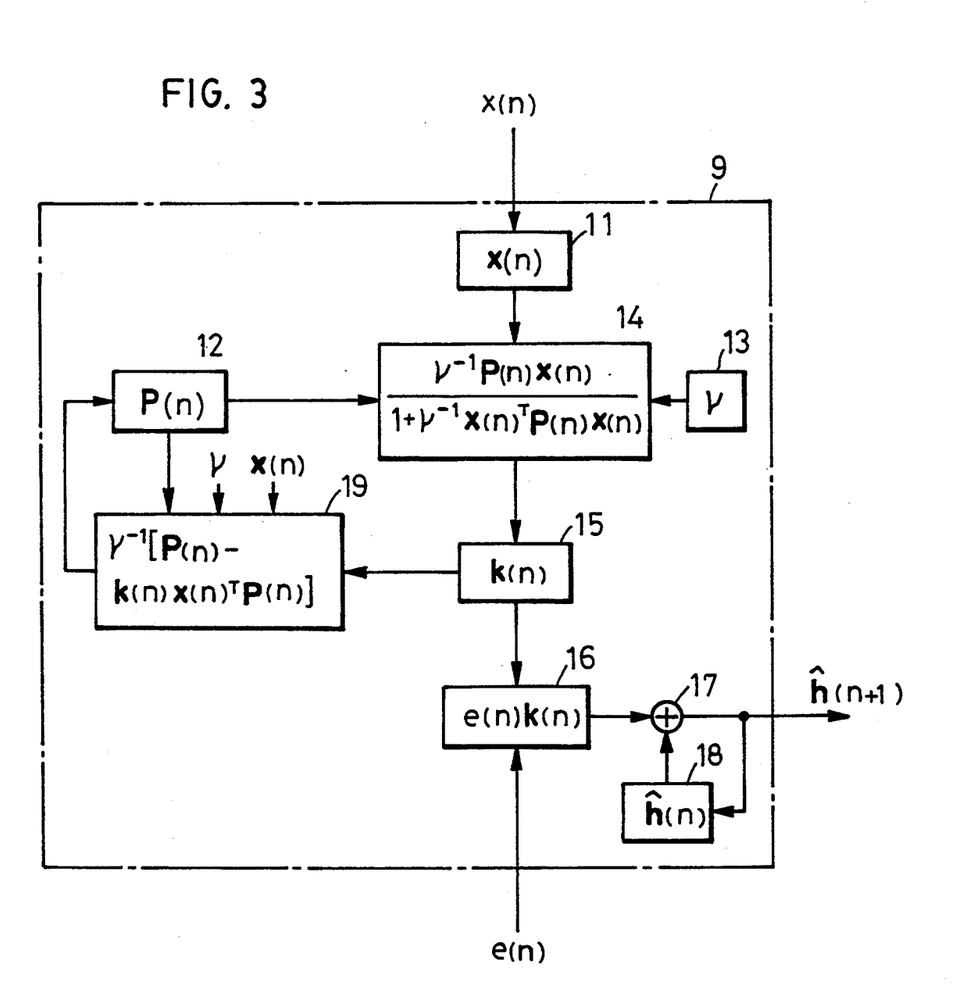
FIG. 3 is a block diagram illustrating the internal configuration of an estimating part 9 in FIG. 1.

FIG. 3 shows an example of the configuration of the estimating part 9 in FIG. 1 that uses the RLS algorithm involving Eqs. (4) through (7).

The received signal x(n) is fed to a received signal memory part 11, wherein it is rendered into a received signal vector x(n). The received signal vector x(n), the coefficient error covariance matrix P(n) from a coefficient error covariance matrix memory part 12 and the forgetting factor $v$ from a forgetting factor memory part 13 are provided to a gain calculating part 14, wherein the calculation of Eq. (5) is conducted. The thus obtained gain vector k(n) is stored in a gain memory part 15. The gain vector k(n) and the error e(n) are provided to a multiplying part 16, wherein the second term on the right-hand side of Eq. (4) is calculated. The calculated output is supplied to an adding part 17, wherein it is added to the filter coefficient ĥ(n) from the tap coefficient memory part 18 to obtain ĥ(n+1). The calculated value ĥ(n+1) is provided onto the estimated echo path 6 in FIG. 1, while at the same time it is provided to the tap coefficient memory part 18 to update its stored contents.

The coefficient error covariance matrix P(n) from the coefficient error covariance matrix memory part 12, the gain vector k(n) from the gain memory part 15, the received signal vector x(n) from the received signal memory part 11 and the forgetting factor $v$ from the forgetting factor memory part 13 are provided to an updating part 19, wherein the calculation of Eq. (6) is conducted to update the value P(n) stored in the coefficient error covariance matrix memory part 12.

Through the processings described above, the impulse response ĥ(n+1) which is provided as a filter coefficient onto the estimated echo path 6 in FIG. 1 is iteratively adjusted, and thus the impulse response ĥ(n+1) of the estimated echo path 6 approaches the impulse response h(n+1) of the true echo path Pe.

When the input is a white noise, the RLS algorithm converges at about the same speed as the NLMS algorithm, and hence has a disadvantage that the convergence speed is slow.

SUMMARY OF THE INVENTION

It is therefore an object of the present invention to provide an echo cancelling method and an echo canceller which permit fast convergence for a white noise as well as for a speech signal.

According to the present invention, an adjustment matrix A which represents expected values of the impulse response variation is added to the coefficient error covariance matrix P(n) contained in the RLS algorithm to thereby reflect the impulse response variation characteristics of the acoustic echo path on the RLS algorithm.

With such a configuration, it is possible to obtain an echo canceller which has a convergence speed twice as fast as that of the conventional echo canceller employing the RLS algorithm.

DESCRIPTION OF THE PREFERRED EMBODIMENT

As described later, the echo canceller of the present invention differs from the prior art example of FIG. 1 only in the internal configuration of the estimating part 9 and has the same fundamental functional blocks as those shown in FIG. 1; hence, the present invention will also be described in conjunction with FIG. 1.

As described previously, the received signal x(t) at the terminal 1 is converted by the loudspeaker 2 into an acoustic signal, which is provided onto an echo path Pe having an impulse response h(t) and then converted by the microphone 3 into an echo y(t). The echo y(t) is converted by the A/D converting part 7 into a sampled echo y(n). On the other hand, the received signal x(t) is converted by the A/D converting part 5 into a sampled signal x(n), which is provided onto the estimated echo path 6 formed by a digital adaptive filter which performs a convolutional processing, such as an FIR filter, while at the same time it is applied to the estimating part 9. An echo replica ŷ(n), which is the output from the estimated echo path 6, is provided to the subtracting part 8, wherein it is subtracted from the echo y(n). An error e(n), which is the output from the subtracting part 8 and provided to the estimating part 9, is converted by the D/A converting part 10 to an electrical signal e(t), which is provided to the terminal 4. The estimating part 9 estimates the impulse response of the echo path on the basis of the error e(n) and the received signal x(n) and uses the estimated impulse response as a filter coefficient to control the characteristic of the digital adaptive filter that forms the estimated echo path 6.

Next, a description will be given of the principle of operation of the estimating part 9 which is characteristic of the present invention.

As referred to previously, the coefficient error covariance matrix P(n) used in Eqs. (5) and (6) in the RLS algorithm can be regarded as statistical expectation that is expressed as follows:

$$P(n) = E[\{h_0 - \hat{h}(n)\}\{h_0 - \hat{h}(n)\}^T]. \quad (8)$$

Since the impulse response variation of the echo path Pe attenuates exponentially at the same attenuation ratio as that of the impulse response, it is desirable that the diagonal component of the coefficient error covariance matrix P(n) also attenuate exponentially at the same attenuation ratio as that of the impulse response. To impart such a characteristic to the matrix P(n), the filter coefficient is adjusted with the following algorithm added with the adjustment matrix A (a diagonal matrix) representing the expectation of the impulse response variation.

$$\hat{h}(n+1) = \hat{h}(n) + e(n) \cdot k(n) \quad (4)$$

$$k(n) = \frac{\nu^{-1} \cdot P(n) \cdot x(n)}{1 + \nu^{-1} \cdot x(n)^T \cdot P(n) \cdot x(n)} \quad (10)$$

$$P(n+1) = \nu^{-1}[P(n) - k(n) \cdot x(n)^T \cdot P(n)] + A \quad (11)$$

where $$A = \begin{bmatrix} \alpha_1 & & & 0 \\ & \alpha_2 & & \\ & & \ddots & \\ 0 & & & \alpha_L \end{bmatrix} : \text{Adjustment matrix}$$

$$\alpha_i = \alpha_0 \gamma^{i-1} \; (i=1, 2, \ldots, L) \quad (12)$$

γ: exponential attenuation ratio of the impulse response variation of the echo path (0<γ<1).

The forgetting factor ν may be set to 1. Eqs. (9), (10) and (11) show the algorithm of the present invention. Eqs. (9) and (10) are identical with Eqs. (4) and (5) of the RLS algorithm but Eq. (11) differs from Eq. (6) in that the former is added with the adjustment matrix A. The method of the present invention based on Eqs. (9), (10) and (11) will hereinafter be referred to as an ES-RLS algorithm. Incidentally, when A=0, the algorithm of the present invention agrees with the conventional RLS algorithm.

Figure 4:
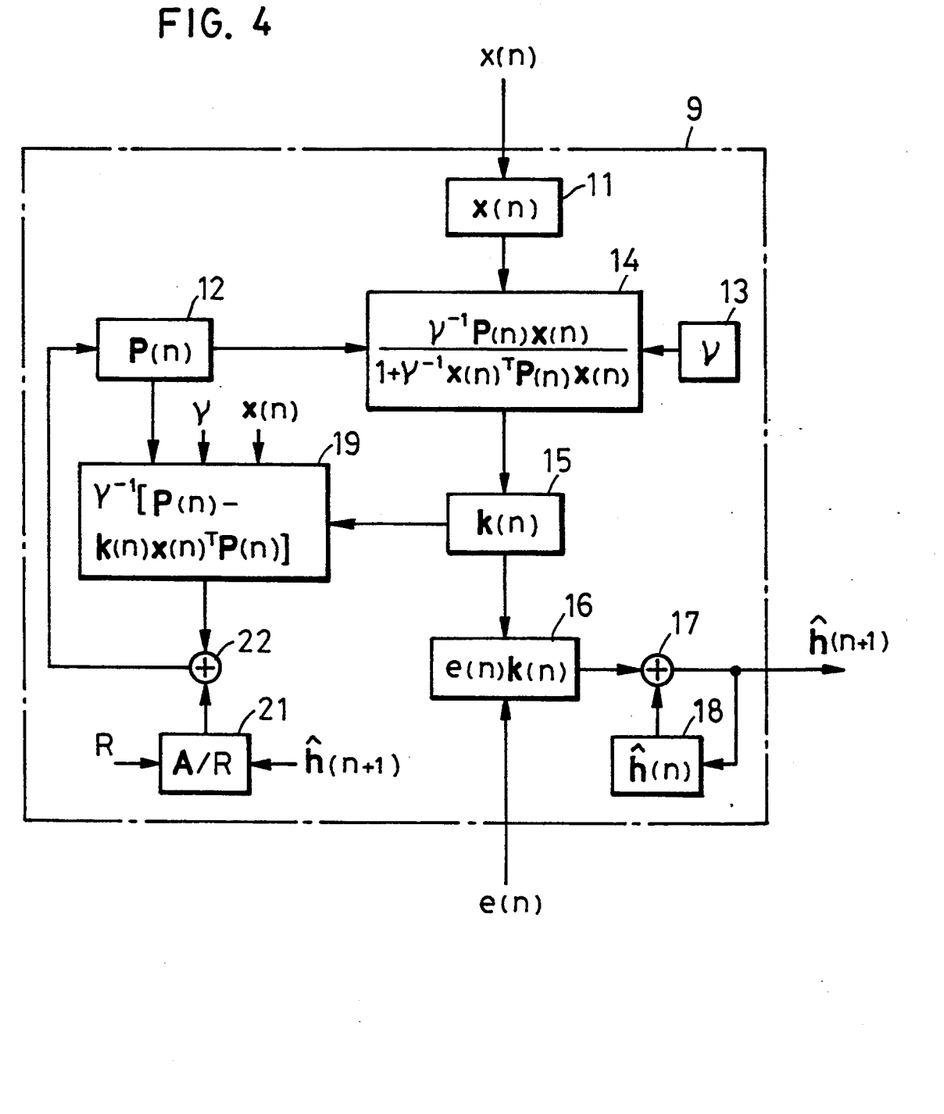
FIG. 4 is a block diagram illustrating the configuration of the estimating part 9 that forms the principal part of an embodiment of the present invention.

FIG. 4 illustrates an example of the internal configuration of the estimating part 9 which is the principal part of the present invention, the parts corresponding to those in FIG. 3 being identified by the same reference numerals.

The received signal x(n) is rendered into a received signal vector x(n) in the received signal memory part 11. The received signal vector x(n), the coefficient error covariance matrix P(n) from the coefficient error covariance matrix memory part 12 and the forgetting factor ν from the forgetting factor memory part 13 are supplied to the gain calculating part 14, in which the calculation of Eq. (10) is performed to obtain a gain vector k(n), which is stored in the gain memory part 15. The gain vector k(n) and the error e(n) from the subtracting part 8 are provided to the multiplying part 16, wherein the second term on the right-hand side of Eq. (9) is calculated. The calculated output is provided to the adding part 17, wherein it is added to the filter coefficient, ĥ(n), of the estimated echo path 6 from the tap coefficient memory part 18 to obtain ĥ(n+1). The result of calculation, ĥ(n+1), is provided to the estimated echo path 6 in FIG. 1, while at the same time it is provided to the tap coefficient memory part 18 to update its stored value.

The coefficient error covariance matrix P(n) from the coefficient error covariance matrix memory part 12, the gain vector k(n) from the gain memory part 15, the received signal vector from the gain memory part 15, the received signal vector x(n) from the received signal memory part 11 and the forgetting factor ν from the forgetting factor memory part 13 are provided to the updating part 19, wherein the first term on the right-hand side of Eq. (11) is calculated.

In an adjustment generating part 21 there is prestored the adjustment matrix A (a diagonal matrix) which is precalculated. The output from the updating part 19 and the adjustment matrix A from the adjustment matrix generating part 21 are fed to an adding part 22, wherein Eq. (11) is calculated to update the value of the coefficient error covariance matrix memory part 12.

In the case where the estimated echo path 6 in FIG. 1 is formed by a digital FIR filter, its filter coefficient $\hat{h}(n)$ is a directly simulated version of the impulse response $h(n)$ of the echo path Pe. Hence, the coefficient error immediately after the variation of the echo path Pe coincides with the variation of the impulse response $h(n)$. Then, by adding the diagonal component of the coefficient error covariance matrix $P(n)$ with the adjustment matrix A (a diagonal matrix) representing the expectation of the impulse response variation, it is possible to reflect the impulse response variation characteristic of the echo path. In general, the room impulse response variation is expressed as an exponential function using the attenuation ratio $\gamma$. The diagonal component $\alpha_i (i=1, 2, \ldots, L)$ of the adjustment matrix A attenuates exponentially from $\alpha_0$ and gradually approaches 0 as i increases, with the same slope or gradient as that of the exponential attenuation characteristic of the impulse response, as shown in FIG. 2.

Through the above-described processing the estimated echo path 6 in FIG. 1 is iteratively adjusted and its impulse response $\hat{h}(n)$ approaches the impulse response $h(n)$ of the true echo path.

The adjustment matrix A is the same as the step size matrix in Eq. (2) according to the ES algorithm and can be determined in the following fashion as described in the aforementioned Makino et al U.S. patent.

At first, a proper initial value, for example, $\alpha_i = 1$ (i=1, 2, \ldots, L), is given to the adjustment matrix A and, for example, a white noise is applied as the received signal $x(t)$ to the terminal 1 (FIG. 1) to obtain the echo $y(t)$ in the microphone 3. On the basis of these signals the echo replica $\hat{y}(n)$ and the error $e(n)$ are obtained, and the error and the received signal are used to obtain the impulse response $\hat{h}$ of the estimated echo path 6. By repeating these operations an adaptive operation is conducted to minimize the error $e(n)$, converging the impulse response $\hat{h}$ of the estimated echo path 6 on the impulse response $\hat{h}$ of the true echo path. As described previously with respect to the prior art shown in FIGS. 1 through 3, since the variation of the impulse response $h$ of the echo path Pe attenuates at the same exponential attenuation ratio as that of the impulse response itself, the attenuation ratio $\gamma$ of the impulse response $\hat{h}$ thus estimated is obtained as the exponential attenuation ratio $\gamma$ of the variation of the impulse response $h$ of the echo path Pe. The exponential attenuation ratio $\gamma$ could be derived from the impulse response $\hat{h}$ by approximately solving an equation composed of L equalities that are obtainable by substituting values of respective components $h_1, h_2, \ldots, h_L$ of the impulse response $\hat{h}$ into the following equation:

$$|\hat{h}_i| = |\hat{h}_0 \gamma^{i-1}|.$$

Alternatively, the above equation is transformed into the following linear equation concerning i, in which the ratio $\gamma$ could be derived from its gradient $\gamma$.

$$\log|\hat{h}_i| = \log|\hat{h}_0| + (i-1)\log\gamma$$

The exponential attenuation ratio is determined in the adjustment matrix generating part 21. The adjustment matrix A thus determined need not be updated unless the sound field (a conference room, for instance) is changed to a different one.

The exponential attenuation ratio $\gamma$ thus determined corresponding to the attenuation ratio of the room impulse response is substituted into Eq. (12) to calculate the diagonal component $\alpha_i$. In this instance, however, the diagonal component $\alpha_i$ is selected so that the mean value $\bar{\alpha}$ of the diagonal component $\alpha_i$, for example, may be a desired value. To this end, in the FIG. 4 embodiment a matrix A/R is used in place of the adjustment matrix A; that is, the mean value of the diagonal component is expressed by $\bar{\alpha}/R$ and a desired convergence characteristic is obtained by properly changing R.

Figure 5:
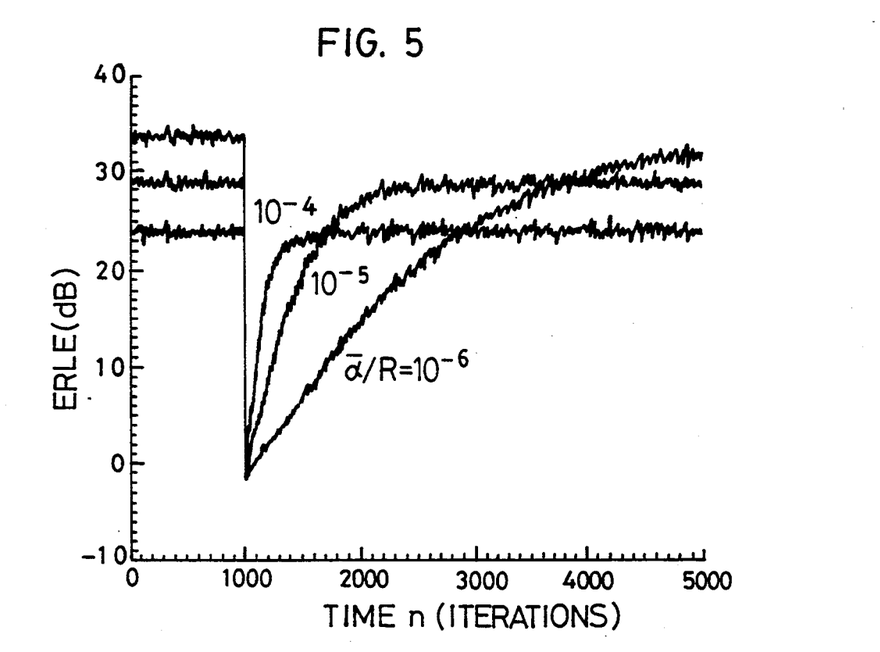
FIG. 5 is a simulation graph showing the relationship between the convergence characteristic of echo return loss enhancement (ERLE) and a mean value $\bar{a}/R$ of the diagonal components according to the present invention.

FIG. 5 shows the results of computer simulation of the convergence characteristic of the echo return loss enhancement (ERLE) in the cases where the above-said mean value $\bar{\alpha}/R$ is $10^{-4}$, $10^{-5}$ and $10^{-6}$. The received signal $x(t)$ is a white noise, the number of taps L is 64 and the impulse response is changed at time n = 1000. As depicted in FIG. 5, an increase in the mean value $\bar{\alpha}/R$ increases the convergence speed but decreases the steady-state echo return loss enhancement. Hence, taking into account the tradeoff between the steady-state echo return loss enhancement and the convergence speed, for example, when room or ambient steady-state noise is large, R is selected large to increase the steady-state echo return loss enhancement.

Figure 6A:
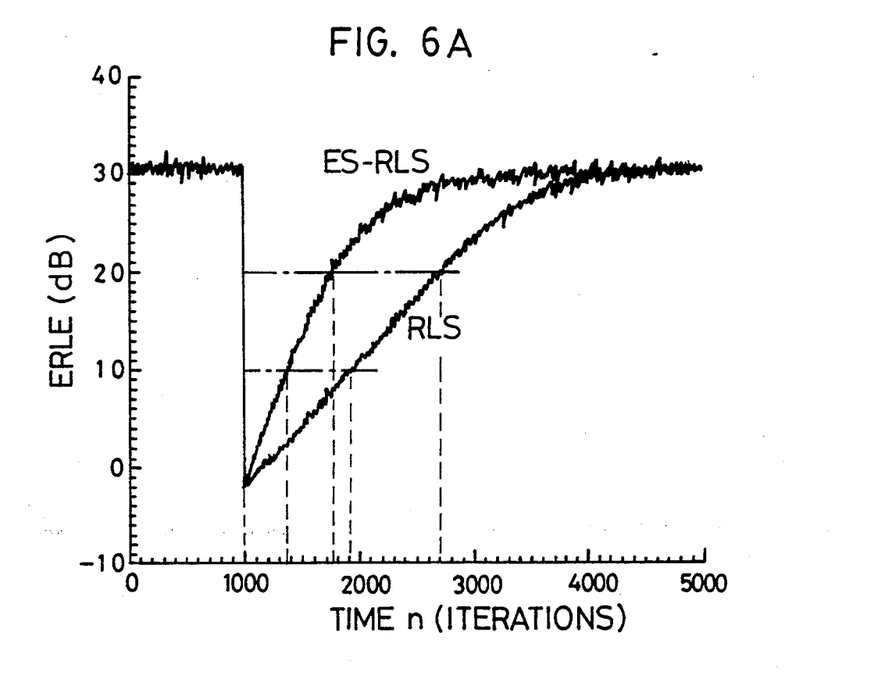
FIG. 6A is a graph showing the results of simulation of the convergence by the present invention and the prior art when the input signal is a white noise.
Figure 6B:
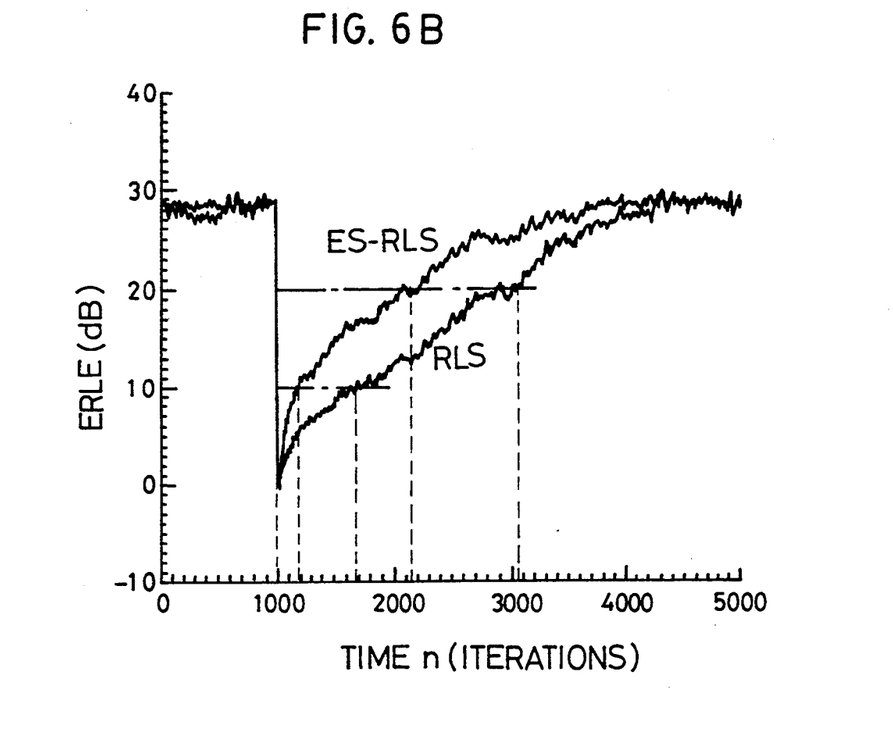
FIG. 6B is a graph showing the results of simulation of the convergence by the present invention and the prior art when the input signal is a speech signal.

In FIGS. 6A and 6B, computer simulation results on ERLE convergence characteristics of the echo canceller using the ES-RLS algorithm according to the present invention are shown in comparison with similar computer simulation results on the conventional echo canceller using the RLS algorithm. The simulations used an exponentially attenuating impulse response (64 taps) created by the computer. The received signals used were a white noise and a speech signal and a near-end or ambient noise was added to the echo to provide a steady-state ERLE of 30 dB. The impulse response was changed at time n = 1000. The convergence curves shown are each a mean value of 50 trials. To give a steady-state ERLE of 30 dB or so, the forgetting factor $\nu$ of the RLS algorithm and the mean value $\bar{\alpha}/R$ of the diagonal component of the adjustment matrix A according to the present invention are set as follows:

$$\bar{\alpha}/R = (1/RL)\Sigma \alpha_i = \frac{(\alpha_0/L)(1-\gamma^L)}{R(1-\gamma)}.$$

It will be seen that when the input signal is a white noise (FIG. 6A) the convergence speeds by the ES-RLS algorithm according to the present invention at which echo return loss enhancements (ERLE) of 10 dB and 20 dB are reached are about 2.6 times and about 2.2 times faster than the convergence speeds by the conventional RLS algorithm, and that when the input signal is a speech signal (FIG. 6B) the convergence speeds by the ES-RLS algorithm at which the echo return loss enhancements (ERLE) of 10 dB and 20 dB are reached are about 3.4 times and 1.7 times faster than the convergence speeds by the RLS algorithm.

Figure 7:
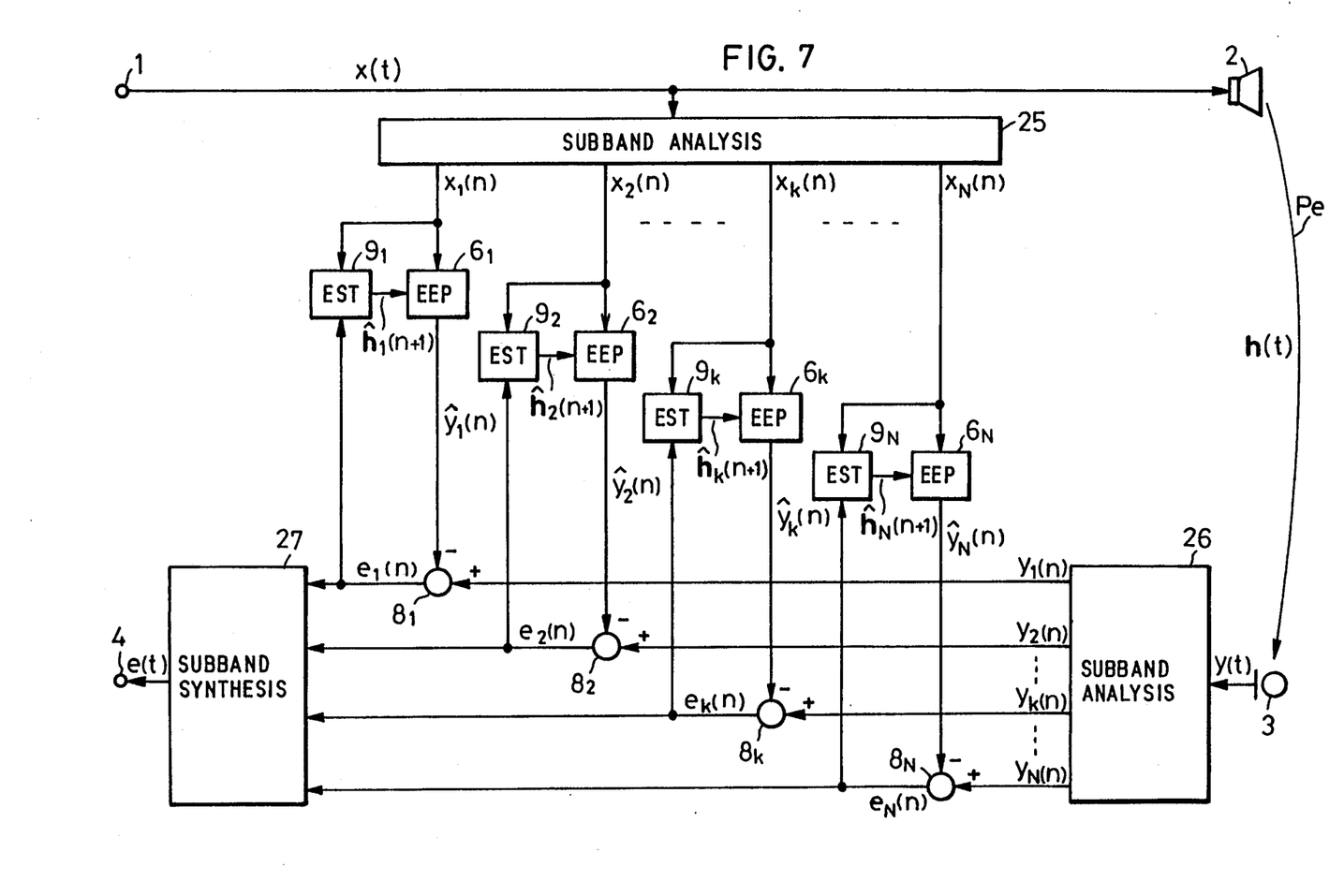
FIG. 7 is a block diagram illustrating an embodiment of the present invention which employs a sub-band scheme.

The sub-band scheme disclosed in the aforementioned Makino et al U.S. patent may also be applied to the present invention shown in FIG. 4. As depicted in FIG. 7, the received signal $x(t)$ is divided by a sub-band analysis part 25 into N frequency bands to generate sub-sampled received signals $x_1(n)$ through $x_N(n)$. Similarly, the echo replica $y(t)$ is also divided by a sub-band analysis part 26 into N frequency bands to generate sub-sampled echo replicas $y_1(n)$ through $y_N(n)$. Estimated echo paths $6_1$ through $6_N$ and estimating parts $9_1$ through $9_N$, which are identical in configuration to the estimated echo path 6 in FIG. 1 and the estimating part 9 in FIG. 4, respectively, are provided for the respective sub-bands. The estimating parts $9_1$ through $9_N$ predetermined adjustment matrixes $A_1$ to $A_N$ of the respective sub-bands in the same manner as described previously in connection with FIG. 4 and use them to calculate impulse responses $\hat{h}_1$ through $\hat{h}_N$, which are fed as filter coefficients to the corresponding estimated echo paths $6_1$ to $6_N$, respectively. The echo replicas $\hat{y}_1(n)$ through $\hat{y}_N(n)$, which are outputs from the estimated echo paths, are provided to subtracting parts $8_1$ through $8_N$, wherein they are subtracted from the echoes $y_1(n)$ through $y_N(n)$ to obtain errors $e_1(n)$ through $e_N(n)$, which are provided to the corresponding estimating parts $9_1$ through $9_N$, while at the same time the errors are synthesized in a sub-band synthesis part 27, the output of which is provided to the terminal 4 after being converted to analog form. Thus, the application of the sub-band scheme to the present invention permits reduction of the computational quantity involved.

Figure 8:
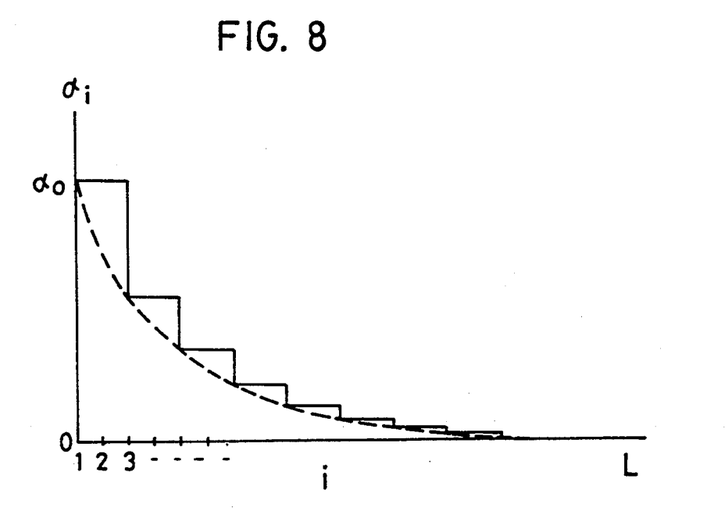
FIG. 8 is a graph showing an example of a stepwise approximation of the diagonal component $a_i$ of the adjustment matrix A.

In each of the embodiments described above, the exponential attenuation curve of the diagonal component $\alpha_i$ can also be approximated with steps smaller in number than the number of taps L as shown in FIG. 8. This also permits reduction of the computational quantity and storage capacity needed. While the present invention has been described in connection with the case where the room impulse response variation has an exponential attenuation characteristic, the invention is also applicable in the cases of other arbitrary variation characteristics. Moreover, the digital adaptive filter has been described to be an FIR filter, but it may also be replaced with other arbitrary digital adaptive filters.

As described above, according to the present invention, the adjustment matrix A (a diagonal matrix), which represents the expectation of the impulse response variation of the echo path, is added to the coefficient error covariance matrix P(n) to thereby reflect the variation characteristic of the impulse response of the acoustic echo path on the conventional RLS algorithm—this makes it possible to obtain an echo canceller that converges about twice as fast as the conventional echo canceller using the RLS algorithm. In the handsfree telecommunication system the echo path frequently varies owing to movements of persons, for instance, and a quick response to such a variation improves the speech quality accordingly.

It will be apparent that many modifications and variations may be effected without departing from the scope of the novel concepts of the present invention.

What is claimed is:

1. An echo canceller which repeats operations of: providing a received signal onto an echo path to obtain therefrom an echo; generating an echo replica by applying said received signal to estimated echo path means formed by a digital adaptive filter having an estimated impulse response as a filter coefficient; subtracting said echo replica by subtracting means from said echo and outputting the resulting error signal as an echo-cancelled or echo-free signal; and estimating said filter coefficient of said estimated echo path means, as its impulse response, by impulse response estimating means on the basis of said error signal and said received signal and iteratively adjusting said filter coefficient by a recursive least-squares (RLS) algorithm;

wherein said impulse response estimating means includes:
adjustment matrix storage means for storing an adjustment matrix representing an expectation of an impulse response variation of said echo path; and adding means for adding said adjustment matrix to a coefficient error covariance matrix in said RLS logarithm to generate an adjusted coefficient error covariance matrix.

2. The echo canceller of claim 1 wherein said impulse response estimating means includes:
gain vector generating means for generating a gain vector on the basis of said adjusted coefficient error covariance matrix and the vector of said received signal;
covariance matrix generating means for generating an updated version of said coefficient error covariance matrix on the basis of said adjusted coefficient error covariance matrix and said gain vector;
multiplying means for multiplying said gain vector and said error signal to generate an adjustment coefficient;
coefficient storage means for storing the current filter coefficient; and
coefficient updating means which adds together said adjustment coefficient and said current filter coefficient from said coefficient storage means to generate the next filter coefficient and provides it to said estimated echo path means and updates said filter coefficient in said coefficient storage means.

3. The echo canceller of claim 1 or 2 wherein said adjustment matrix is a diagonal matrix having a diagonal component that attenuates at an exponential attenuation ratio $\gamma$.

4. The echo canceller of claim 3 wherein said adjustment matrix is a diagonal matrix having a diagonal component that attenuates in a stepwise manner which approximates an attenuation curve attenuating at said exponential attenuation ratio $\gamma$, in steps smaller in number than the number of taps of said estimated echo path means.

5. The echo canceller of claim 2 wherein, letting said received signal be represented by x(n), said echo by y(n), said adjustment matrix by A, said error signal by e(n), said filter coefficient indicating the impulse response of said estimated echo path means by h(n+1), said adjusted coefficient error covariance matrix by P(n+1) and said gain vector by k(n), said gain vector generating means is a means for calculating $$k(n) = \frac{\nu^{-1} \cdot P(n) \cdot x(n)}{1 + \nu^{-1} \cdot x(n)^T \cdot P(n) \cdot x(n)};$$

said covariance matrix generating means is a means for calculating, as said updated coefficient error covariance matrix, $$\nu^{-1}[P(n) - k(n) \cdot x(n)_T \cdot P(n)];$$

said adding means is a means for calculating, as said adjusted coefficient error covariance matrix, $$P(n+1) = \nu^{-1}[P(n) - k(n) \cdot x(n)_T \cdot P(n)] + A;$$

said multiplying means calculates the product, e(n)k(n), of said gain vector k(n) and said error signal e(n) as said adjustment coefficient; and
said coefficient updating means calculates $$\hat{h}(n+1) = \hat{h}(n) + e(n) \cdot k(n),$$

and provides the calculated output, as said filter coefficient, to said estimated echo path means, while at the same time updating the contents of said coefficient storage means,
where $$A = \begin{bmatrix} \alpha_1 & & & 0 \\ & \alpha_2 & & \\ & & \cdot & \\ & & & \cdot \\ 0 & & & \alpha_L \end{bmatrix} : \text{adjustment matrix,}$$

$\alpha_i = \alpha_0 \gamma^{i-1}$ for $i = 1, 2, \ldots L$,

L: number of taps of said digital adaptive filter forming said estimated echo path means, $\gamma$: exponential attenuation ratio of the impulse response variation of said echo path, where $0 < \gamma < 1$, and $\nu$: forgetting factor, where $0 < \nu \leq 1$.

6. The echo canceller of claim 1, 2, or 5 wherein said estimated echo path means, said impulse response estimating means and said subtracting means are each provided corresponding to N frequency bands, N being an integer equal to or greater than 2, said echo canceller further including:

first sub-band analysis means which divides said received signal into sub-band received signals of said N frequency bands and applies them to said estimated echo path means and said impulse response estimating means corresponding thereto, said estimated echo path means of each sub-band outputting a sub-band echo replica;

second sub-band analysis means which divides said echo into sub-band echoes of said N frequency bands and applies them to said subtracting means corresponding thereto, said subtracting means for each frequency band subtracting said sub-band echo replica from the corresponding sub-band echo to generate a sub-band error signal and providing it to said impulse response estimating means for the corresponding frequency band; and sub-band synthesis means which combines said N sub-band error signals into a composite signal and outputs it as said echo-cancelled signal.

7. An echo cancelling method which repeats steps of: providing a received signal onto an echo path to obtain therefrom an echo; generating an echo replica by applying said received signal to estimated echo path means formed by a digital adaptive filter having an estimated impulse response as a filter coefficient; subtracting said echo replica from said echo and outputting the resulting error signal as an echo-cancelled or echo-free signal; and estimating said filter coefficient of said echo path means as its impulse response on the basis of said error signal and said received signal and iteratively adjusting said estimated filter coefficient by recursive least-squares (RLS) algorithm;

wherein said impulse response estimating step includes:

a step of storing an adjustment matrix representing an expectation of an impulse response variation of said echo path;

a step of adding said adjustment matrix to a coefficient error covariance matrix in said RLS algorithm to generate an adjusted coefficient error covariance matrix;

a step of generating a gain vector from said adjusted coefficient error covariance matrix and the vector of said received signal;

a step of generating an updated coefficient error covariance matrix from said adjusted coefficient error covariance matrix and said gain vector;

a step of multiplying said gain vector and said error signal to generate an adjustment coefficient;

a step of storing the current filter coefficient; and a step wherein said adjustment coefficient and said filter coefficient stored in said coefficient storing step are added together to generate the next filter coefficient and said next filter coefficient is provided to said estimated echo path means and is used to update said filter coefficient in said coefficient storage step.

8. The echo cancelling method of claim 7 wherein, letting said received signal be represented by x(n), said echo by y(t), said adjustment matrix by A, said error signal by e(n), said filter coefficient expressing the impulse response of said estimated echo path means by $\hat{h}(n+1)$, said adjusted coefficient error covariance matrix by $P(n+1)$ and said gain vector by $k(n)$, said gain vector generating step is a step of calculating $$k = \frac{\nu^{-1} \cdot P(n) \cdot x(n)}{1 + \nu^{-1} \cdot x(n)^T \cdot P(n) \cdot x(n)};$$

said covariance matrix generating step is a step of calculating, as said updated coefficient error covariance matrix, $$\nu^{-1}[P(n) - k(n).x(n)^T.P(n)];$$

said adding means is a step of calculating, as said adjusted coefficient error covariance matrix, $$P(n+1) = \nu^{-1}[P(n) - k(n).x(n)^T.P(n)] + A;$$

said multiplying step is a step of calculates the product, $e(n)k(n)$, of said gain vector $k(n)$ and said error signal $e(n)$ as said adjustment coefficient; and said coefficient updating step is a step of calculating $$\hat{h}(n+1) = \hat{h}(n) + e(n).k(n),$$

and providing the calculated output, as said filter coefficient, to said estimated echo path means, while at the same time updating said coefficient stored in said coefficient storage step,
where $$A = \begin{bmatrix} \alpha_1 & & & 0 \\ & \alpha_2 & & \\ & & \cdot & \\ & & & \cdot \\ 0 & & & \alpha_L \end{bmatrix} : \text{adjustment matrix,}$$

$\alpha_i = \alpha_0 \gamma^{i-1}$ for $i = 1, 2, \ldots, L$,

L: number of taps of said digital adaptive filter forming said estimated echo path means, $\gamma$: exponential attenuation ratio of the impulse response variation of said echo path, where $0 < \gamma < 1$, and $\nu$: forgetting factor, where $0 < \nu \leq 1$.

* * * * *